United States Patent [19]

Kordak et al.

[11] Patent Number: 4,920,748
[45] Date of Patent: May 1, 1990

[54] HYDRAULIC DRIVE SYSTEM

[75] Inventors: Rolf Kordak, Lohr; Heinrich Nikolaus; Frank Metzner, both of Hamburg, all of Fed. Rep. of Germany

[73] Assignee: Mannesmann Rexroth GmbH, Lahr, Fed. Rep. of Germany

[21] Appl. No.: 639,917

[22] Filed: Aug. 10, 1984

[30] Foreign Application Priority Data

Aug. 23, 1983 [DE] Fed. Rep. of Germany ....... 3330367

[51] Int. Cl.$^5$ .............................................. F16H 39/50
[52] U.S. Cl. ....................................... 60/414; 60/444; 60/449
[58] Field of Search ................. 60/414, 389, 443, 444, 60/447, 449; 180/165

[56] References Cited

U.S. PATENT DOCUMENTS

| 4,168,612 | 9/1979 | Nikolaus | 60/488 |
| 4,461,147 | 7/1984 | Myers | 60/448 |

FOREIGN PATENT DOCUMENTS

| 2633577 | 4/1977 | Fed. Rep. of Germany | 60/443 |
| 2739968 | 3/1979 | Fed. Rep. of Germany | 60/448 |
| 3107780 | 12/1982 | Fed. Rep. of Germany | . |
| 0648168 | 9/1979 | U.S.S.R. | 60/449 |
| 2102922 | 2/1983 | United Kingdom | 60/449 |

OTHER PUBLICATIONS

"Olhydraulik und Pneumatik" 26 (1982), No. 2, pp. 74–82.

Primary Examiner—Gerald A. Michalsky
Attorney, Agent, or Firm—Harness, Dickey & Pierce

[57] ABSTRACT

The torque of a hydraulic machine is dependent of the fluid pressure delivered to the machine and is further dependent of the adjustment of its volume of throughput. In response to a load coupled to the machine, a speed results which is controlled by a speed control system acting on the adjusting system of the hydraulic machine. According to the invention, an electro hydraulic speed control comprises a pair of control circuits which are connected to, but operate independent of each other. Thus the electrical control circuit produces a control signal $y_{e1}$ from the difference of the actual value and the desired value of the speed for adjusting a hydraulic restricting means which produces a hydraulic pressure signal $p_{st}$ in the hydraulic control circuit which pressure signal is compared with a hydraulic reference signal $p_o$ to produce a differential pressure signal $p_o - p_{st}$ which is applied to the adjusting cylinder of the hydraulic machine. The control system thus comprises two circuits, i.e. an electrical speed control circuit and a hydraulic pressure control circuit resulting in optimizing the control operation.

7 Claims, 1 Drawing Sheet

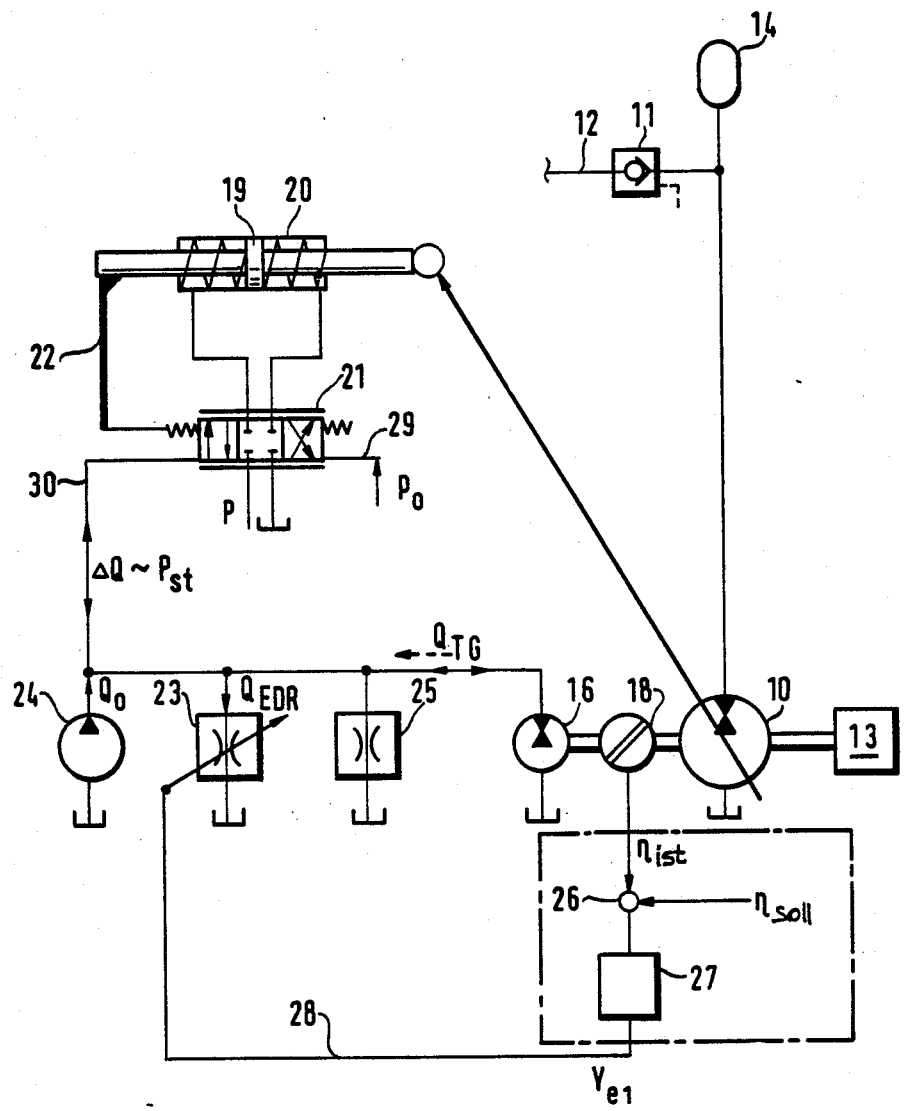

HYDRAULIC DRIVE SYSTEM

BACKGROUND OF THE INVENTION

An article on pages 74-82 of the periodical "Olhydraulik und Pneumatik" 26 (1982) No. 2 concerns a hydraulic drive system comprising a first hydraulic machine with adjustable volume of through-put capable of working as a pump or motor, a line of load-independent pressure to which said first machine is connected, a second hydraulic machine as a signal transmitter capable of working as a motor or pump in response to the direction of rotation of said first machine to produce a control flow proportional to the actual speed of the first machine to which the second machine is mechanically coupled, and a flow restricting system including a pump and an adjustable throttle which system in combination with the control flow of said signal transmitter delivers a pressure signal $p_{st}$ which is compared with a predetermined pressure $p_o$, wherein the control device for setting the volume of through-put of said first machine is activated in response to the differential pressure $p_{st}-o$. Such drive system is capable of working in a four-quadrant operation i.e. the system is capable of delivering as well as receiving energy in both directions of rotation. It is an object of the present invention to improve the speed control to obtain a reaction rate as fast as possible. It is a further object to dampen and to stabilize the control process to avoid heavy transient response.

SUMMARY OF THE INVENTION

According to the invention there is provided a hydraulic drive system, comprising a first hydraulic machine with adjustable volume of through-put capable of working as a pump or motor, a line of load-independent pressure, to which said first machine is connected, a second hydraulic machine as a signal transmitter capable of working as a motor or pump in response to the direction of rotation of said first machine to produce a control flow proportional to the actual speed of the first machine to which the second machine is mechanically coupled, and a flow restricting system including a pump and an adjustable throttle which system in combination with the control flow of said signal transmitter delivers a pressure signal $p_{st}$ which is compared with a predetermined pressure $o$, wherein the control device for setting the volume of through-put of said first machine is activated in response to the differential pressure $_{st}-p_o$ wherein the adjustable throttle is set by the output signal of an electrical control means receiving a differential signal which is defined by a desired speed signal and an actual speed signal produced in a tacho generator which is mechanically coupled to said first hydraulic machine.

According to the invention there is provided an electro hydraulic speed control in which the hydraulic pressure control is superimposed by an electrical speed control which control signal $y_{el}$ corrects the pressure signal pst of the control circuit, wherein the value $p_{st}$ is additionally responsive to the flow $Q_{TG}$ of a hydraulic unit which is coupled to the hydraulic machine. The pressure signal $p_{st}$ can be defined to be an actual value pressure.

A speed change of the hydraulic machine first results in a very fast change of the control flow produced by the hydraulic signal transmitter, from which a relatively strong change of the pressure signal $p_{st}$ and an immediate adjustment of the through-put volume of the hydraulic machine results.

The hydraulic control circuit operates nearly free of any delay, but is not capable of setting an output speed which is independent of the load of the hydraulic machine. The speed is rather dependent of the magnitude of the load torque $M_{10}$. The electrical control circuit senses the load responsive speed changes by virtue of the tacho generator to produce a control signal $Y_{el}$ which sets the hydraulic throttling means and varies the pressure signal $p_{st}$ of the hydraulic control circuit until the hydraulic machine runs at a desired speed which is predetermined by the electrical control circuit.

Practical testing has shown that system stabilization and accuracy of control are at an optimum under the following condictions:

the hydraulic control circuit operates as free of any delays as possible and the electrical control circuit operates somewhat slower than the hydraulic circuit. In this way the combination of control optimizes the control characteristics to set the speed in a shortest possible time avoiding transients when a new speed is required due to load changes or changes in setting the desired speed value. Furthermore, the system increases safety because the hydraulic control system is still effective when the electrical control should fail.

BRIEF DESCRIPTION OF THE DRAWING

An embodiment of the invention is described below with reference to the accompanying drawing in which a hydraulic drive system is shown diagrammatically.

DETAILED DESCRIPTION OF THE PREFERRED EMBODIMENT

In the drawing, a hydraulic machine 10 is connected via a check valve 11 which may be opened by a pilot signal to a pressure line 12 in which a constant pressure is maintained. The hydraulic machine 10 is coupled to a load 13. When the machine 10 works as a motor, pressure medium is taken from the pressure line or, respectively from the hydraulic accummulator 14, whereas the machine 10 working as a pump delivers pressure medium through the check valve 11 to the pressure line and/or to the accummulator.

The machine 10 is mechanically coupled to a hydraulic machine 16 defining a signal transmitter or a tacho generator and further to an electrical tacho generator 18. A pilot valve 21 which is for example a spring-centered 4/3-directional servo valve is provided to set the piston 19 of the adjusting cylinder 20 of the machine 10. A pressure signal $_{st}$ in the line 30 and a reference pressure $o$ of constant value in line 29 are supplied to the servo valve which signal $o$ represents a system-inherent reference value which is set to a predetermined value. The pressure difference $p_o-p_{st}$ causes to move the piston of the servo valve 21 until the force arising from the pressure difference is compensated by the spring force. Both cylinder chambers of the adjusting cylinder 20 can be selectively connected to a pressure source P or to the reservoir via the pilot valve 21. Accordingly the servo valve serves to set the volume of through-put of the machine 10.

The servo valve is provided with a mechanical feed back 2 in being connected to the piston 19 (force or stroke feed back).

The pressure signal $p_{st}$ is determined by a differential flow $\Delta Q$ which is produced in the hydraulic control system as described below. The volume of through put set for the machine 10 determines the torque of the machine. In response to the load 13, a corresponding speed of the machine 10 results. The hydraulic tacho generator 16 produces a control flow $Q_{TG}$ proportional to said actual value of the machine speed which control flow returns to the reservoir via a setting throttle 23, said control flow determining the feed back gain of the hydraulic control circuit. The pressure signal $p_{st}$ prevails in the line 30 which pressure signal is further modulated by a flow $Q_0$ of constant volume produced by a constant volume pump 24. Due to this combination of setting throttle 23 and constant volume pump 24 it is possible that the tacho generator 16 operates as a pump or motor in response to the direction of rotation of the machine 10 so that the control flow $Q_{TG}$ may be reversed. The difference of the control flow $Q_{TG}$ and the flow $Q_{EDR}$ representing a desired value results in a differential flow $\Delta Q$, which passes through the setting throttle 23, there producing the pressure signal $p_{st}$ which acts as an actual value signal on the servo valve 21 which varies the volume of through-put of the machine 10 until the forces resulting of the spring forces and pressure forces acting on the servo valve 21 are in balance to each other.

The setting throttle 23 can be built as a proportional valve or as a flow control valve. Additionally a constant throttle 25 is connected in parallel to the setting throttle to dynamically optimize the operation of the pressure control circuit. The throttle 25 thus allows a portion of the control flow $Q_{TG}$ returning to the reservoir resulting in an improved control response.

The servo valve 21 is connected to the adjusting servo 19, 20 via a force feed back i.e. a force proportional to the position of the piston 19 acts on the springs of forces resulting from the pressure difference $p_0 - p_{st}$ when the system is stationary.

The pressure difference control system above referred to thus represents a control circuit for compensating the motion of the adjusting servo 19, 20. Since this motion is characteristic for the magnitude of the output torque of the machine 10 the system practically is defined to be a torque control system.

To this hydraulic control an electrical speed control system 26, 27 is superimposed. For this the electrical tacho generator 18 delivers a signal which corresponds to the actual value $n_{ist}$ of the speed of the machine 10, which signal is compared in a comparing circuit 26 with a signal $n_{soll}$ representing the desired speed value. The control deviation is fed to a driver circuit 27 which produces a control signal $Y_{el}$ on the line 28 for effecting a corresponding setting of the throttle 23.

The system above referred to defines an electro hydraulic speed control in which a hydraulic pressure control underlies the electrical speed control. The hydraulic control circuit provides for a very fast response due to the pressure signal pst which is modulated by the tacho generator machine 16 so that a relatively powerful and fast actual pressure signal is produced which allows for a fast setting of the displacement volume of the machine 10. Contrarily, the response of the electrical speed control circuit may be adjusted by the response characteristic of the controller 26, 27 such that the desired dynamic response of the hydraulic control is maintained, while the bad stationary response of the hydraulic control circuit resulting in large stationary control deviations is greatly improved resulting in an integrated control response to decrease control deviations to zero.

We claim:

1. A hydraulic drive system, comprising a first hydraulic machine having an adjustable volume of through-put and operable as a pump or motor, a line of load-independent pressure to which said first machine is connected, a second hydraulic machine coupled for rotation with said first machine for functioning as a signal transmitter for providing a hydraulic signal indicative of speed of said first machine, said second machine being operable as a motor or pump in response to the direction of rotation of said first machine to produce a control flow speed signal proportional to the actual speed of the first machine, and means for adjusting the through-put of said first machine comprising a flow restricting system for providing a pressure signal including a pump and an adjustable throttle cooperable with the control flow of said signal transmitter for delivering a pressure signal $P_{st}$ which is compared with a predetermined pressure $P_O$ for setting the volume of through-put of said first machine in response to the differential pressure $p_{st} - p_O$, characterized by a tacho generator driven by said first machine for providing an electrical signal indicative of actual speed of operation of said first machine, $n_{ist}$, said adjustable throttle being set by an output signal of an electrical control means receiving a differential signal which is defined by a desired speed signal $n_{soll}$ and an actual speed $n_{ist}$.

2. The hydraulic drive system of claim 1, wherein said adjustable throttle comprises a flow control valve.

3. The drive system of claim 1, wherein said adjustable throttle comprises a proportional valve.

4. The drive system of claim 1, wherein a fixed throttle is provided in parallel to said adjustable throttle and wherein said fixed throttle is set independent of the electrical control signal.

5. The drive system of claim 1, wherein the differential pressure is fed to a directional servo valve comprising a pilot valve for the volume control device of said first machine and wherein said directional servo valve is mechanically connected to said control device via a feed back.

6. The drive system of claim 1, wherein the adjustable throttle comprises a pressure control valve.

7. The drive system of claim 1, wherein the adjustable throttle comprises a servo valve.

* * * * *